United States Patent
Nguyen et al.

(10) Patent No.: US 6,804,493 B2
(45) Date of Patent: Oct. 12, 2004

(54) MOBILE SURFACE TERMINAL COMMUNICATION SYSTEM

(75) Inventors: Tien M. Nguyen, Placentia, CA (US); Jack K. Holmes, Agoura Hills, CA (US)

(73) Assignee: The Aerospace Corporation, El Segundo, CA (US)

( * ) Notice: Subject to any disclaimer, the term of this patent is extended or adjusted under 35 U.S.C. 154(b) by 392 days.

(21) Appl. No.: 10/115,759

(22) Filed: Apr. 3, 2002

(65) Prior Publication Data

US 2003/0190889 A1 Oct. 9, 2003

(51) Int. Cl.$^7$ .............................................. H04B 7/185
(52) U.S. Cl. ....................... 455/12.1; 455/13.1; 455/403; 375/343; 375/149
(58) Field of Search ............................... 455/12.1, 431, 455/427, 454, 17, 23, 96, 98, 102, 108; 375/141, 146, 147, 142, 150, 140, 149; 370/315, 316, 320, 335, 342

(56) References Cited

U.S. PATENT DOCUMENTS 5,081,462 A * 1/1992 Tachita et al. ............... 342/352
5,263,045 A * 11/1993 Schilling ...................... 375/148
5,866,838 A * 2/1999 Mayersak .................... 89/1.56
6,272,189 B1 * 8/2001 Garin et al. ................. 375/343
6,463,091 B1 * 10/2002 Zhodzicshsky et al. ..... 375/149
6,493,378 B1 * 12/2002 Zhodzishsky et al. ...... 375/149
2003/0030584 A1 * 2/2003 Hirata et al. ........... 342/357.12

* cited by examiner

*Primary Examiner*—Nick Corsaro
*Assistant Examiner*—Tan Trinh
(74) *Attorney, Agent, or Firm*—Derrick Michael Reid (57) ABSTRACT

A command and telemetry communication system includes a downlink subsystem having a spacecraft downlink transmitter communicating a quadrature component carrying a pilot code for coarse acquisition and an inphase component carrying a Walsh-Hadamard code and a PN code for fine acquisition using spread spectrum signaling and amplitude modulation for code division multiplexing to downlink receivers respectively disposed in a plurality of mobile surface landers, and includes an uplink subsystem having a spacecraft uplink receiver and lander uplink transmitters communicating code division multiple access telemetry data using spread spectrum signaling and phase modulation. The communication system enables command and telemetry control of a plurality of mobile surface landers.

18 Claims, 3 Drawing Sheets

MULTIPLE MOBILE SURFACE TERMINAL SYSTEM

MOBILE SURFACE TERMINAL COMMUNICATION SYSTEM

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of mobile communication systems. More particularly, the present invention relates to a communication system including a central terminal and a plurality of identical mobile surface terminals for communicating command and telemetry data.

BACKGROUND OF THE INVENTION

There have been several proposed Mars missions that require a networked communication system for communicating unpacketized command and control data between an orbiting spacecraft and a plurality of multiple mobile landers. The communication system can be used to support an investigation of Mars. The networked communication system may include several, for example, ten, small mobile landing vehicles, that is, landers, distributed over the Martian surface to form a global network of communicating mobile landers. The multiple mobile surface terminals are needed for surveying vast surface areas of Mars while communicating command and telemetry data with the orbiting spacecraft. For these Mars missions, more than one lander may be within the beamwidth of a single spacecraft antenna. Each of the mobile surface terminals, or landers, will each need communication transceivers and antennas. The commanding and tracking of the moving landers, as well as the reception of telemetry data is required during surveying operations.

A conventional deepspace networked communications system includes multiple deepspace spacecraft communicating with an earth ground station. Each of the multiple deepspace spacecraft has a respective communication transceiver and antenna for communicating with the single earth ground station. The ground station tracks each of the spacecraft. The communication channel can be characterized as an additive white Gaussian noise channel communicating encoded data using conventional communication encoding, modulation, and channelization techniques. Such systems do not address fading and multiple path problems as the communication is primarily through empty space between the deepspace spacecraft and the ground station. A deepspace networked communications system includes a command uplink and a telemetry downlink. The deepspace networked communications system does not provide for command and control of multiple surface landers using command downlinks and telemetry uplinks.

In deep space applications, the round trip communication time between a deep space spacecraft and a ground station is relatively large as compared to earth orbit communications. The communications uplinks and downlinks use conventional phase modulation signaling. Therefore, multiple spacecraft appear to be stationary within the beamwidth of the ground station antenna. By contradistinction, mobile terminals on the surface may appear to the orbiting spacecraft to be moving within the same beamwidth of the spacecraft antenna as does the personal communications system used on Earth. For deepspace communications, multiple command channels are sent directly from a single ground station. A single ground station receives telemetry data over many communications channels. Therefore, weight and power consumption are not of concern to the communication designers of a ground based system. For a mobile surface lander application, weight and power are of significant design considerations.

In a personal communications system environment, where the users are moving within a single beamwidth of the base station antenna, direct sequence spread spectrum communication methods are used to communicate with several users using communications spreading codes respectively for each personal system. The spreading codes enable code division multiple access communications for separated and isolated reliable communications. The command and telemetry communications are sent from and received by the spacecraft over multiple mobile landers similar in the design to personal communication system handsets. However, the personal communication systems may disadvantageously require ranging signals for determining the distance to the personal mobile terminal, and are not used to communicate command and telemetry data for orbiting spacecraft control of a plurality of mobile surface terminals. Hence, there exists a need for a light weight and low power multiple lander communication system that offers both command and telemetry communication links over separated and isolated communications channels with an ability to communicate with multiple landers in the beamwidth of the central spacecraft system.

In the global positioning system (GPS), clear/acquisition short code (C/A) and pseudo-random nonstandard long codes (PN) are used using BPSK modulators for transmitting code division multiple access signals. The PN code can be acquired as a pilot code for initial code tracking, while the C/A code is used for separating users. The communication channel for multiple mobile lander applications is not an average white Gaussian noise channel because fading and multipath effects are caused by ground terrain upon which are moving the mobile landers. Existing deepspace communication systems can not be directly used for mobile lander applications because fading and multipaths caused by the planet surface may corrupt communications channel signals. The personal communications systems use spread spectrum signals for code division multiple access but disadvantageously lack command and telemetry channels necessary for remote navigation, command and control. These and other disadvantages are solved or reduced using the invention.

SUMMARY OF THE INVENTION

An object of the invention is to provide a system for communicating data between a central orbiting system and a plurality of mobile surface terminals.

Another object of the invention is to provide a communication system for communicating command and telemetry data between a spacecraft and a plurality of mobile landers.

Yet another object of the invention is to provide a communication system for communicating command and telemetry data between a spacecraft and a plurality of mobile landers using a command downlink for communications from the spacecraft, and using a telemetry uplink for communications from the landers.

Still another object of the invention is to provide a communication system for communicating data between a spacecraft and a plurality of mobile landers using a command downlink for communications from the spacecraft, and using a telemetry uplink for communications from the landers, using direct sequence spread spectrum communications.

Yet a further object of the invention is to provide a communication system for communicating data between a spacecraft and a plurality of mobile landers using a command downlink and a telemetry uplink using direct sequence spread spectrum communications with a pilot code used for signal acquisition.

The present invention is directed to a code division multiple access networked communication system for communicating command and telemetry data between a central system and a plurality of mobile surface terminals. A terminal is a communications transceiver with antennas in a lander that is capable of moving on the surface of a planet, such as Earth or Mars. The central system is a communications transceiver with antennas in an airborne or spaceborne craft, such as a spacecraft that is typically on-station in a prescribed orbit about the planet on which the landers move. Multiple landers are at times within the beamwidth of a single spacecraft antenna of the spacecraft for enabling simultaneous or concurrent communications with the multiple landers. The communication system includes an uplink and a downlink for two-way communications between the central spacecraft system and the plurality of surface mobile terminals. The uplink is a communications link from the terminals to the spacecraft. The downlink is a communications link from the spacecraft to the terminals. The uplink may be referred to as the telemetry uplink and the downlink may be referred to as the command downlink. The system uses direct sequence spread spectrum spreading for enabling code division multiple access communications for concurrently communicating with multiple landers. The communication system provides for reliable uplink and downlinks communications in the presence of fading and multipath affects due to variable surface terrain and atmospheres through and around which signals are communicated. The communication system includes a downlink subsystem having a spacecraft downlink transmitter communicating a quadrature component carrying a pilot code for coarse acquisition and an inphase component carrying a Walsh-Hadamard code and a PN code for fine acquisition. The downlink subsystem uses spread spectrum signaling and amplitude modulation for code division multiplexing to downlink receivers respectively disposed in a plurality of mobile surface landers. The communication system also includes an uplink subsystem having a spacecraft uplink receiver and lander uplink transmitters communicating code division multiple access telemetry data using spread spectrum signaling and phase modulation. The communication system enables command and telemetry control of a plurality of mobile surface landers.

The communication system has reduced mass, size, and power consumption. The communication system provides increased command and telemetry data throughput with accurate command and telemetry performances using accurate range measurements for the mobile surface terminals. The communication system uses a new set of communications standards for multiple surface lander applications for improved command and control communications. These and other advantages will become more apparent from the following detailed description of the preferred embodiment.

DETAILED DESCRIPTION OF THE PREFERRED EMBODIMENT

Figure 1:
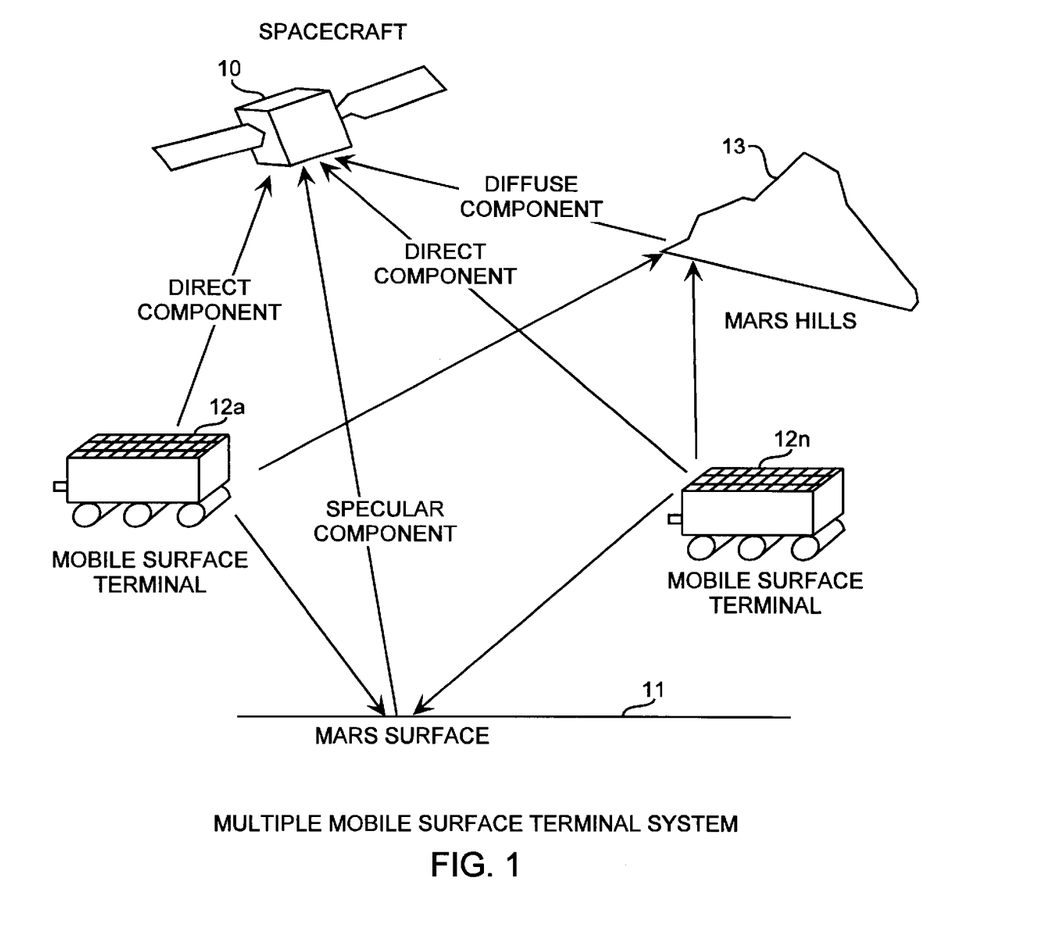
FIG. 1 is a diagram of a multiple mobile surface terminal system.

An embodiment of the invention is described with reference to the figures using reference designations as shown in the figures. Referring to FIG. 1, a communication system is a communication network for communicating command and control data between a single spacecraft and multiple landers. A spacecraft 10 communicates with a plurality of N mobile surface terminals on the martial surface 11, such as terminals 12a through 12n, that may be moved over the surface 11 and near Martian hills 13. The landers are shown with wheels for movement and a top solar panel for power collection. As the mobile surface terminals 12a and 12n communicate with the spacecraft, direct, specular and diffuse components of the communication signals are created due to the Martian surface that creates fading and multipaths. For reliable communications, the spacecraft 10 and landers 12a and 12n use reliable simultaneous uplink and downlink communications in the presence of multipaths, fading and channel interference. The communication system includes the uplink communication subsystem is shown in FIG. 2 and the downlink communication subsystem is shown in FIG. 3.

Figure 2:
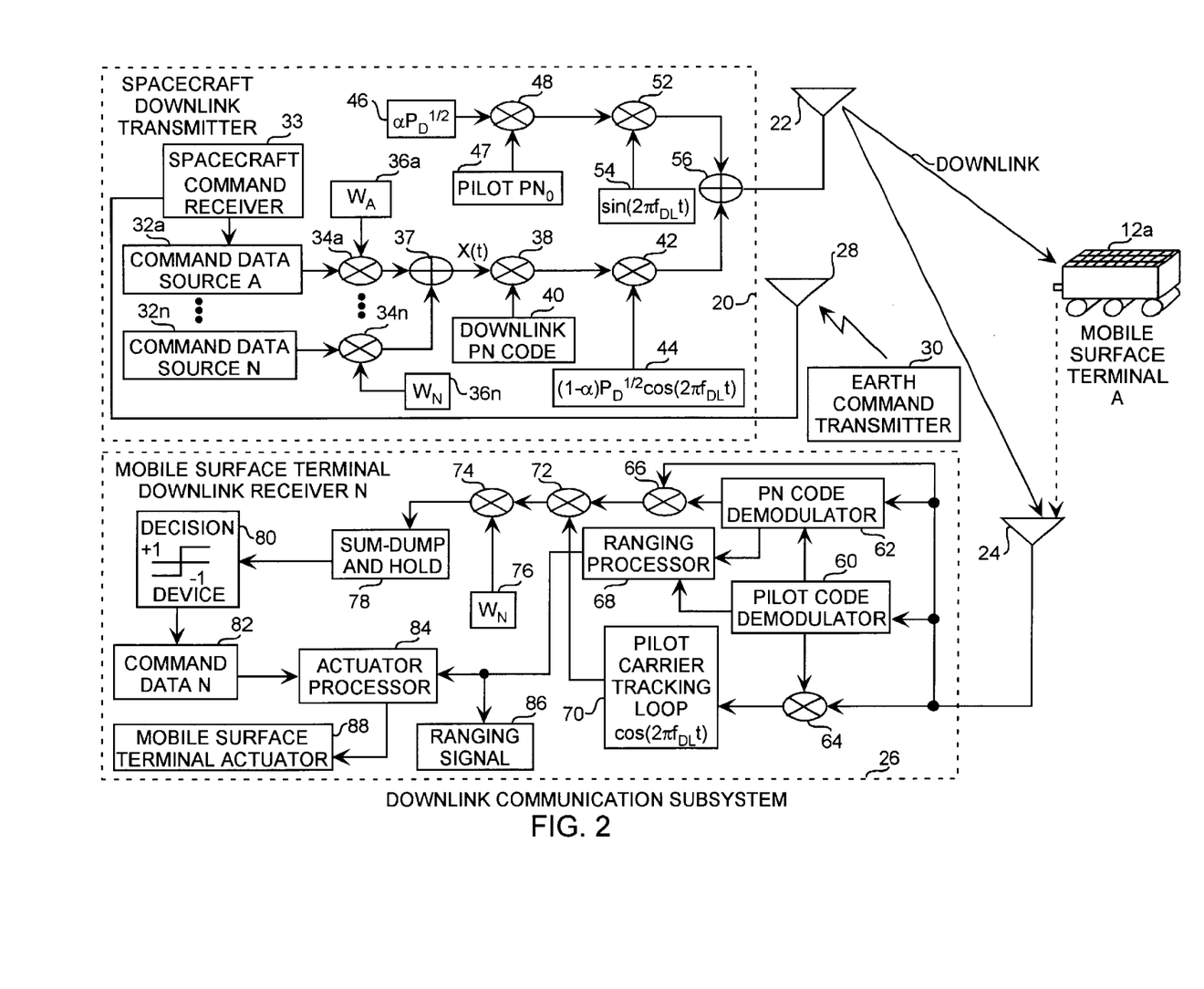
FIG. 2 is block diagram of an uplink communication subsystem.
Figure 3:
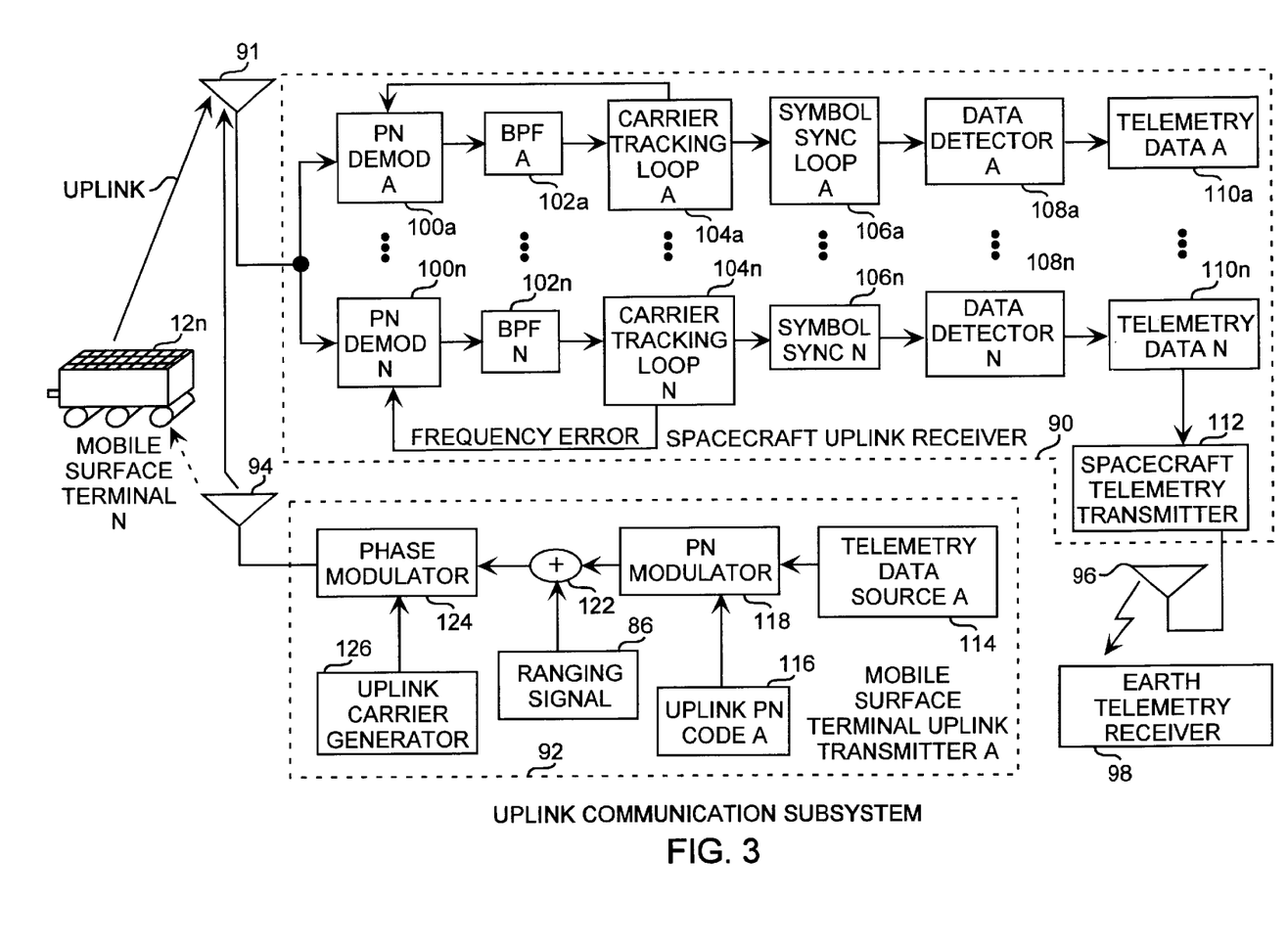
FIG. 3 is block diagram of a downlink communication subsystem.

Referring to FIG. 1 and FIG. 2, the downlink communication subsystem enables communications from the spacecraft 10 down to N mobile surface terminals 12a through 12n, also referred to herein as landers A through N. The downlink communication subsystem includes a spacecraft downlink transmitter 20 having a spacecraft downlink antenna 22 communicating to the landers A through N, such as mobile surface terminals 12a through 12n. Each of the mobile surface terminal terminals, such as terminal 12n includes a mobile surface mobile surface terminal, or lander, downlink antenna 24, and a mobile surface terminal, or lander, receiver 26 for communicating command data over the downlink. The downlink extends between the spacecraft downlink antenna 22 and the lander downlink antenna 24. Preferably, the downlink communication subsystem further includes a spacecraft command antenna 28 for receiving command signals from an earth command transmitter 30.

Using the downlink, direct sequence spread spectrum (DSSS) communications is applied using code division multiplexing (CDM) with quadrature signaling and with Walsh-Hadamard (WH) codes $W_A$ through $W_N$, a pseudorandom noise (PN) code, and a pilot PNo code for communicating from the spacecraft to the landers. The downlink uses amplitude modulation with conventional high power amplifiers, not shown, operating at saturation within bit error rates as a function of the number of landers. The downlink subsystem uses CDM where the WH codes are used to separate the downlink command signals with reduced cochannel interference. The WH codes are well known for having zero cross-correlation at zero time delays. Thus, when synchronization of all landers can be maintained, the WH codes provide orthogonal sequences for isolating respective downlink command signals to the landers. The WH codes are used for downlink communications because the transmitted command data for each lander can be synchronized to start at the same time for one-to-many multiple access.

A spacecraft command receiver 33 receives commands from the earth command transmitter 30 and separates the received commands into command data sources 32a through 32n for each of the landers. Each of the command data sources 32a through 32n communicate respective ith command data to respective command data mixers 34a through

34n for respectively modulating the ith command data from the command data sources 32a through 32n by respective $W_A$ through $W_N$ codes from $W_A$ through $W_N$ code generators 36a through 36n for generating respective modulated command data. The ith command data $d_i(t)$ is modulated by the ith WH code $W_i(t)$ into the respective modulated command data. The WH codes are used to provide mutually orthogonal waveforms for reducing cochannel interference. WH codes are selected to ensure that all users are orthogonal to each other. All of the WH code modulated command source signals are summed together using a command data adder 37 for providing an X(t) composite command signal that is defined by a composite command signal equation.

$$X(t) = d_1(t)W_1(t) + \ldots + d_n(t)W_n(t) = \sum_{i=0}^{n} d_i(t)W_i(t)$$

In the composite command signal equation, n is the number of landers, and $d_i(t)$ is the ith command data for the ith lander, and $W_i(t)$ is the ith WH code for the ith lander. The composite data signal from the command adder 37 is fed to a pseudorandom noise (PN) downlink PN code modulator 38 for modulating a downlink pseudorandom noise PN code waveform PN(t) from a downlink PN code generator 40 for generating a PN command signal. The downlink PN code waveform has a chip rate equal to the WH code bit rate. The number of landers N is less than or equal to B, the number of WH code bits per data bit. The downlink quadrature modulator 42 provides a PN command signal that is multilevel. The PN command signal is multilevel to amplitude modulate an $(1-\alpha)P_D^{1/2} \cos(2\pi f_{DL}t)$ downlink quadrature carrier signal carrier having a frequency of $f_{DL}$ provided by a downlink quadrature carrier generator 44. The PN command signal amplitude modulates the downlink quadrature carrier for generating a quadrature PN command signal, that may have, for example, an $f_{DL}$=L1 frequency.

A pilot level generator 46 provides an αPD pilot level signal that is modulated by a pseudorandom noise PNo(t) pilot code from a pilot code generator 47 using a pilot code modulator 48 for providing a αPDPNo(t) pilot signal. The αPDPNo(t) pilot signal is modulated using a downlink inphase modulator 52 and a downlink inphase carrier signal $\sin(2\pi f_{DL}t)$ from a downlink inphase carrier generator 54 for providing an inphase pilot signal $\alpha PDPNo(t)\sin(2\pi f_{DL}t)$. A downlink transmitter summer 56 adds the inphase pilot signal with the quadrature PN command signal for providing the downlink signal $S_{DL}$. The resultant downlink signal $S_{DL}$ from the downlink transmitter summer 56 can be described by a downlink signal equation.

$$S_{DL}(t) = \sqrt{P_D}(1-\alpha)PN(t)X(t)\cos(2\pi f_{DL}t) + \sqrt{P_D}\alpha PN_0(t)\sin(2\pi f_{DL}t)$$

In the downlink signal equation, PD is the downlink transmitted power, α denotes the modulation index, which is less than or equal to one, and PNo(t) denotes the PNo(t) pilot code sequence that has a chip rate much lower than the chip rate of PN(t) PN code, such as one tenth the rate. The downlink signal $S_{DL}$ is amplitude modulated in quadrature. The downlink signal structure of the downlink signal equation consists of two components, including the inphase component carrying the pilot code and quadrature component carrying the command data and PN and W codes. The number of landers N is less than or equal to B, the number of WH code bits per data bit. The quadrature component carries the command data, $W_i(t)$ code and PN code transmitted to the landers. The inphase component carries the pilot level that is spread by the pilot code PNo(t) as a pilot tone.

The downlink signal $S_{DL}(t)$ is received by the lander receiver antenna 24 of the lander downlink receiver 26. For the ith lander, the pilot code sequence timing is acquired first. The pilot tone is used for fast coarse acquisition of the PN code, and acquisition and tracking of the carrier. The downlink signal $S_{DL}(t)$ is fed to a pilot code demodulator, a PN code demodulator, a pilot mixer 64 and a PN code demodulator 60. The pilot code demodulator senses the downlink signal $S_{DL}(t)$ and generates a pilot code replica phase adjusted in gross code phase for demodulating the pilot code from the downlink signal $S_{DL}(t)$. The pilot carrier tracking ling 70 tracks the downlink quadrature carrier $\cos(2\pi f_{DL}t)$ for demodulating. The PN code demodulator 62 receives a code phase and the pilot code from the pilot code demodulator 60 and generates the PN code at the code phase for demodulating the PN code from the downlink signal using a PN code mixer 66. The pilot code demodulator 60 and the PN code demodulator 62 communicate the pilot code and PN codes to a ranging processor for range determinations. The downlink signal with the PN codes removed by mixer 66, is communicated to a WH code mixer that demodulates the downlink quadrature carrier by the $W_i(t)$ code of the respective lander for generating a raw command data signal. The raw command data signal from the mixer 74 is summed over a command data bit period and dumped to a decision device 80 that makes a hard bit determination of the bits in the command data 82. The decision device and sum and dump and hold device function as a data detector for detecting the command data. The command data can then be fed to a actuator processor 84 for controlling a lander actuator such has a wheel motor drive for moving the lander about the Martian surface.

The pilot carrier tracking loop 70 can acquire and track the downlink carrier and provide a quadrature carrier signal. The coarse acquisition is performed to get the received and locally generated PN code sequences to within a fraction of a chip of the received PN code sequence. The pilot code assists the acquisition because the pilot code has a lower chip rate and hence can be acquired much faster. Because the carrier tracking is not initiated at this time, the coarse code acquisition process is noncoherent and can be implemented using conventional squaring operations for reduced costs, size, and power. Once the pilot code demodulator 60 synchronizes a locally generated pilot code timing of the code phase to be within a chip of the PN code. Continuous tracking by the demodulator 60 is maintained using noncoherent code tracking loops such as a conventional delay-locked loop. After chip synchronization, the carrier of the pilot tone is tracked by the pilot carrier tracking loop, that may use, for example, a phase lock loop. The pilot carrier is then provided by the tracking loop 70 for carrier demodulation by mixer 72 in the inphase channel. Afterwards, the baseband signal for the ith lander is multiplied by $W_i(t)$ code to obtain the command data waveform $d_i(t)$. The ranging processor 68 is used to generate a ranging signal 86 from the downlink signal for enhanced uplink communications.

Referring to FIG. 1 and FIG. 3, the uplink communication subsystem enables communications from the mobile surface terminals 12a through 12n, also referred to herein as landers A through N, up to the spacecraft 10. The uplink communication subsystem includes a spacecraft uplink receiver 90 having a spacecraft uplink antenna 91 for receiving uplink signals $S_{UL}(t)$ from the landers A through N, such as mobile surface terminal N 12n. Each lander A through N includes a mobile surface terminal transmitter, such as mobile surface transmitter A 92 having a respective mobile surface terminal uplink antenna 94. The uplink or uplink channel communicates the uplink signal $S_{UL}(t)$ between the lander uplink antenna 94 and spacecraft uplink antenna 9. The uplink subsystem preferably further includes a spacecraft telemetry antenna 96 for communicating telemetry data with an earth telemetry receiver 98.

Using the uplink, DSSS communications is applied using code division multiple access (CDMA). The uplink subsystem uses CDMA with different PN sequences such as Gold, Kasami, and Bent sequences to separate the lander respective uplink signals. The central spacecraft receives lander telemetry data from a telemetry data source A 114 from Lander A. Each of the multiple moving landers communicates respective lander telemetry data. The uplink signals transmitted from the landers are distinguished from each other through the use of the preassigned pseudo-random noise (PN) code sequences from a PN code generator 116 modulated by the telemetry data from the telemetry data source 114. The ranging signal 86 carries ranging data and is added by a ranging adder 122 for providing a telemetry and ranging signal to a phase modulator 124 that phase modulates an uplink carrier generated by an uplink carrier generator 126 for generating the lander uplink signal communicated by the lander uplink antenna 94 to the spacecraft uplink received antenna 91. The PN codes are modulated by uplink telemetry data and a ranging signal, and then phase modulate the uplink carrier at the uplink carrier frequency that is common to all of the landers. The transmitted uplink signal from all the landers can be expressed by an uplink signal equation.

$$S_{UL}(t) = \sum_{i=1}^{n} \sqrt{2P_{Ui}} \cos(2\pi f_U t + 2\pi f_{ui} t + m_{U_i C_i}(t - \tau_i) d_i(t - \tau_i) + \theta_i)$$

In the uplink signal equation, n is the number of landers and $f_U$ is the uplink frequency. The terms $P_{Ui}$, $c_i(t)$, and $d_i(t)$ are the received signal power at the spacecraft uplink receiver from the ith transmitter, the PN code sequence, and the telemetry data for the ith lander, respectively. Also indicated in the uplink signal equation are Doppler shifts $f_{ui}$, the time delay $\tau_i$, the random phase $\theta_i$, and the telemetry phase modulation index $m_{Ui}$ associated with the ith lander.

The received uplink signals from the spacecraft uplink antenna 91 are fed through a bank of uplink receivers, each of which generates one of the PN codes for the respective landers 12a through 12n. Using a PN code set, the cross-correlation among different PN code sequences can be minimized so that the uplink channel is effectively separated. The PN coded sequences possess good autocorrelation properties and serve as ranging codes for the landers. In the spacecraft uplink receiver 90, the bank of receivers include a noncoherent PN code tracking demodulators 100a through 100n, band pass filters 102a through 102n, followed by conventional carrier tracking loops 104a through 104n, are used to provide chip-level synchronization. Uplink carrier tracking is used to aid the PN code tracking through frequency error feed back. After chip level synchronization, the PN code is removed by demodulation through multiplication by a replica of the PN code generated by the PN code generator 116. The PN code is removed using the PN demodulators 100a through 100n, resulting in a despread narrowband signal embedded in the wideband interference from other landers sharing the same uplink spectrum subject to receiver thermal noise. The despread uplink signal from the carrier loops 100a through 100n are symbol synchronized using symbol synchronization loops 106a through 106n and data detected using data detectors 108a through 108n for generating telemetry data 110a through 110n for each of the landers. The telemetry data 110a through 110n can then be retransmitted using the spacecraft telemetry transmitter 112 and spacecraft telemetry antenna 96 to the earth telemetry receiver 98.

The communication of command data routes from the earth command transmitter 30 through the spacecraft command antenna 28 to the spacecraft command receiver 33 and processed through the spacecraft downlink transmitter 20 and communicated through the spacecraft downlink antenna 22 down the downlink channel to the lander downlink antenna 24 to the lander downlink receiver 26 where the command data is used to control and actuate lander actuators 84. The communication of telemetry data routes from the telemetry data source 114 through the lander uplink transmitter antenna 94 up the uplink channel to the lander uplink antenna 91 to the spacecraft uplink receiver 90 to the spacecraft telemetry transmitter 112 through the spacecraft telemetry antenna 96 to the earth telemetry receiver 98.

The uplink and downlink communication channels are not average white Gaussian noise channels because of the fading and multipath effects involved with the moving landers on the ground. Hence, reliable spread spectrum signaling is used. The PN code set is used to minimize interference among channels and to preserve reliable tracking with accurate ranging measurements. Bidirectional Doppler and Doppler rate effects on PN code acquisition and tracking may cause potential bit error rate degradation at low signal-to-noise ratios. The spread spectrum CDMA used in the uplink provides sufficient signals separation for reliable concurrent communications from the landers to the spacecraft. The pilot tone used in the downlink reduces the acquisition time of the PN code, and acquisition and tracking of the downlink carrier. The proposed architecture provides an increase in command and telemetry data throughput using the parallel bank of receivers, 100a to 110n through 110a to 110n, respectively, with accurate command and telemetry data detection, accurate range measurements for the mobile surface terminals, with reduced mass, size and power consumption. The system can be applied to planetary explorations, such as Mars exploration.

The present invention provides complementary uplink and downlink architectures that enable command and telemetry communications particularly well suited for the lander environment with potential interference, fading and multipath. Direct sequence spread spectrum (DSSS) technique are used to separate different lander signals, to combat fading and multipaths, to provide accurate ranging measurements, without using a separate ranging signal. In the uplink architecture of the spacecraft transmitter and lander receivers, Walsh codes are not used for simplified hardware, cost savings, and reduced power usage. Different long PN codes on the uplink may be used for accurate ranging measurements and location determinations. Different long PN codes are used to separate respective uplink lander signals using conventional cross correlation with sufficient processing gain to protect the landers from interference, fading, and multipath environment while enabling accurate ranging measurements and location determination of the landers. The parallel architecture of the spacecraft receiver enables increased telemetry data throughput. In the downlink architecture, a short pilot code is used to speed up acquisition of the long PN code so as to improve the speed of acquisition and tracking of the carrier. The despread pilot carrier can be tracked by phase lock loops without a squaring loss. A single long PN code is used to provide sufficient processing gain to protect the landers from interference, fading and multipath. The Walsh codes provide orthogonal signal separation among the landers.

Many implementations may be realized. For example, different spread spectrum codes and carrier frequencies can be used for providing improved levels of signal separation. Also, hardware reduction can realized. For example, while shown as two separate lander transmit and receive antennas 24 and 94, the multiple mobile surface terminals could alternatively communicate with the central system using a single antenna. Also, the single central spacecraft can also use a single transmit and receive antenna in place of the spacecraft transmit and receive antennas 22 and 91 for commanding and tracking the multiple moving landers. Those skilled in the art can make enhancements, improvements, and modifications to the invention, and these enhancements, improvements, and modifications may nonetheless fall within the spirit and scope of the following claims.

What is claimed is:

1. A system for communicating respective command data from a central transceiver to respective mobile terminals over a downlink and for communicating respective telemetry data from the respective mobile terminals to the central system over an uplink, the system comprising, a central transmitter of the central transceiver for transmitting respective downlink signals over the downlink for communicating the respective command data from the central transceiver to the respective mobile terminals, the downlink signals are spectrum spread in quadrature with the respective command data and respective first codes and a second code amplitude modulating a downlink carrier on a first quadrature component with a third code amplitude modulating the downlink carrier on a second quadrature component, a central receiver of the central transceiver for receiving respective uplink signals over the uplink communicating the respective telemetry data from the respective mobile terminals to the central transceiver, the central receiver comprising a bank of respective uplink receivers for respectively receiving the respective uplink signals carrying the respective telemetry data from the respective mobile terminals, mobile transmitters respectively for the respective mobile terminals, the mobile transmitters transmitting the respective uplink signals over the uplink for transmitting the respective telemetry data from the respective mobile terminals to the central receiver, the respective uplink signals from respective mobile terminals are spectrum spread using respective fourth codes phase modulating an uplink carrier, and mobile receivers respectively for the respective mobile terminals, the mobile receivers respectively receiving the respective downlink signals over the downlink for respectively receiving the respective command data from the central transmitter, the respective downlink signals are coarsely acquired using the third code on the second quadrature component, and then finely acquired using the respective first codes and the second code on the first quadrature component.

2. The system of claim 1 wherein,
   the central transceiver is on-board a spacecraft
   the central transmitter is a spacecraft downlink transmitter,
   the central receiver is a spacecraft uplink receiver,
   the mobile terminals are landers comprising actuators for movement on a surface of a planet,
   the mobile transmitters are lander uplink transmitters, and
   the mobile receivers are lander downlink receivers.

3. The system of claim 1 wherein,
   the first respective codes are respectively used by the mobile terminals for respectively receiving respective command data from the central transmitter, and
   the fourth respective codes are respectively used by the mobile terminals for respectively transmitting respective telemetry data to the central receiver.

4. The system of claim 1 wherein,
   the central transceiver is on-board a spacecraft
   the central transmitter is a spacecraft downlink transmitter,
   the central receiver is a spacecraft uplink receiver,
   the mobile terminals are landers comprising actuators for movement on a surface of a planet,
   the mobile transmitters are lander uplink transmitters,
   the mobile receivers are lander downlink receivers,
   the first respective codes are respectively used by the landers for respectively receiving respective command data from the spacecraft downlink transmitter, and
   the fourth respective codes are respectively used by the landers for respectively transmitting respective telemetry data to the spacecraft uplink receiver.

5. The system of claim 1 wherein,
   the central transceiver is on-board a spacecraft
   the central transmitter is a spacecraft downlink transmitter,
   the central receiver is a spacecraft uplink receiver,
   the mobile terminals are landers comprising actuators for movement on a surface of a planet,
   the mobile transmitters are lander uplink transmitters,
   the mobile receivers are lander downlink receivers,
   the first respective codes are WH codes respectively used by the lander downlink receivers for respectively receiving respective command data from the spacecraft downlink transmitter,
   the second code in a PN code for fine acquisition of the downlink signal,
   the third code is a pilot code for coarse acquisition of the respective downlink signal, and
   the fourth respective codes are PN codes respectively used by the lander transmitters for respectively transmitting respective telemetry data in the respective uplink signal to the spacecraft uplink receiver.

6. The system of claim 1 further comprising,
   an earth command transmitter for transmitting the command data to the central transmitter,
   a central command receiver for receiving the command data and for separating the command data into the respective command data,
   a central telemetry transmitter for combining the respective telemetry data into the telemetry data and for transmitting the telemetry data, and
   an earth telemetry receiver for receiving the telemetry data.

7. The system of claim 1 wherein each of the mobile transmitters comprise,
   a fourth code modulator for modulating the respective fourth codes by the respective telemetry data and providing a respective modulated fourth code signal, and a phase modulator for phase modulating the uplink carrier by the modulated fourth code signal.

8. The system of claim 1 wherein each of the mobile receivers generate respective ranging data, each of the mobile transmitters comprise,
a fourth code modulator for modulating the respective fourth code by the respective telemetry data and providing a respective modulated fourth code signal,
a summer for modulating the modulated fourth code signal by the respective ranging data, and
a phase modulator for phase modulating the uplink carrier by the modulated fourth code signal.

9. The system of claim 1 wherein each of the mobile receivers comprise,
a third code demodulator for coarsely acquiring the second code,
a second code demodulator for finely acquiring the second code,
a downlink carrier tracking loop for demodulating the downlink carrier signal,
a first code demodulator for demodulating the first code for generating a respective command data signal, and
a data detector for detecting respective command data in the command data signal.

10. The system of claim 1 wherein each of the mobile receivers comprise,
a third code demodulator for coarsely acquiring the second code,
a second code demodulator for finely acquiring the second code,
a downlink carrier tracking loop for demodulating the downlink carrier signal,
a first code demodulator for demodulating the first code for generating a respective command data signal,
a data detector for detecting respective command data in the command data signal, and
an actuator processor for receiving command data and actuating the respective mobile terminal into movement.

11. The system of claim 1 wherein the central receiver, the respective bank uplink receivers each comprise,
a respective fourth code demodulator for demodulating the respective fourth code from the respective uplink signal,
a respective carrier tracking loops for carrier tracking of the uplink carrier of the respective uplink signal, and
respective data detector for detecting the respective telemetry data.

12. The system of claim 1 wherein the central transmitter comprises,
respective first code modulators for modulating the respective first codes by the respective command data for generating respective modulated command data,
a command data summer for summing the respective modulated command data into composite command data,
a second code modulator for modulating the second code by the composite command data for generating modulated code signal,
a quadrature modulator for modulating the downlink carrier by the modulated code signal for generating the first quadrature component,
a third code modulator for modulating a tone level by the third code for generating a modulated third code, and
an inphase modulator for modulating the downlink carrier by the modulated third code for generating the second quadrature component.

13. A system for communicating respective command data from a spacecraft to respective landers over a downlink and for communicating respective telemetry data from the respective landers to the spacecraft over an uplink, the lander having actuators for moving on the surface of a planet, the system comprising,
a spacecraft downlink transmitter on-board the spacecraft for transmitting respective downlink signals over the downlink for communicating the respective command data from the spacecraft to the respective landers, the downlink signals are spectrum spread in quadrature with the respective command data and respective WH codes and a downlink PN code amplitude modulating a downlink carrier on a quadrature component with a pilot code amplitude modulating the downlink carrier on an inphase component, the spacecraft downlink transmitter further for combining the quadrature component and inphase component into the downlink signals,
a spacecraft uplink receiver on-board the spacecraft for receiving respective uplink signals over the uplink communicating the respective telemetry data from the respective landers to the spacecraft, the spacecraft uplink receiver comprising a bank of respective uplink receivers for respectively receiving the respective uplink signals carrying the respective telemetry data from the respective landers,
lander transmitters respectively on-board the respective landers, the lander transmitters transmitting the respective uplink signals over the uplink for transmitting the respective telemetry data from the respective landers to the spacecraft uplink receiver, the respective uplink signals from respective landers are spectrum spread using respective uplink PN codes phase modulating an uplink carrier, and
lander receivers respectively on-board the respective landers, the landers receivers respectively receiving the respective downlink signals over the downlink for respectively receiving the respective command data from the spacecraft downlink transmitter, the respective downlink signals are coarsely acquired using the pilot code on the inphase component, and then finely acquired using the respective WH and PN codes on the quadrature component.

14. The system of claim 13 further comprising,
an earth command transmitter for transmitting the command data to the spacecraft downlink transmitter,
a spacecraft command receiver for receiving the command data and for separating the command data into the respective command data,
a spacecraft telemetry transmitter for combining the respective telemetry data into the telemetry data and for transmitting the telemetry data, and
an earth telemetry receiver for receiving the telemetry data.

15. The system of claim 13 wherein each of the lander transmitters comprise,
a PN code modulator for modulating one of the respective uplink PN codes by the respective telemetry data and providing a respective modulated PN code signal, and
a phase modulator for phase modulating the uplink carrier by the respective modulated PN code signal.

16. The system of claim 13 wherein each of the lander receivers generate respective ranging data from the downlink signals, each of the mobile transmitters comprise,
- a PN code modulator for modulating one of the respective uplink PN codes by the respective telemetry data and providing a respective modulated PN code signal,
- a summer for modulating the respective modulated PN code signal by the respective ranging data, and
- a phase modulator for phase modulating the uplink carrier by the modulated PN code signal.

17. The system of claim 13 wherein the spacecraft uplink receiver, the bank of respective uplink receivers each comprise,
- a respective PN code demodulator for demodulating the respective uplink PN codes from the respective uplink signal,
- a respective carrier tracking loops for carrier tracking the uplink carrier of the respective uplink signal, and
- respective data detectors for detecting the respective telemetry data.

18. The system of claim 13 wherein the spacecraft downlink transmitter comprises,
- respective WH code modulators for modulating the respective WH codes by the respective command data for generating respective modulated command data,
- a command data summer for summing the respective modulated command data into composite command data,
- a downlink PN code modulator for modulating the downlink PN code by the composite command data for generating a modulated code signal,
- an inphase modulator for modulating the downlink carrier by the modulated code signal for generating the inphase component,
- a pilot code modulator for modulating a tone level by the pilot code for generating a modulated pilot code, and
- a quadrature modulator for modulating the downlink carrier by the modulated pilot code for generating the quadrature component.

* * * * *